H. A. KUHN.
MINING MACHINE.
APPLICATION FILED MAY 18, 1914.
1,285,744.
Patented Nov. 26, 1918.
2 SHEETS—SHEET 1.
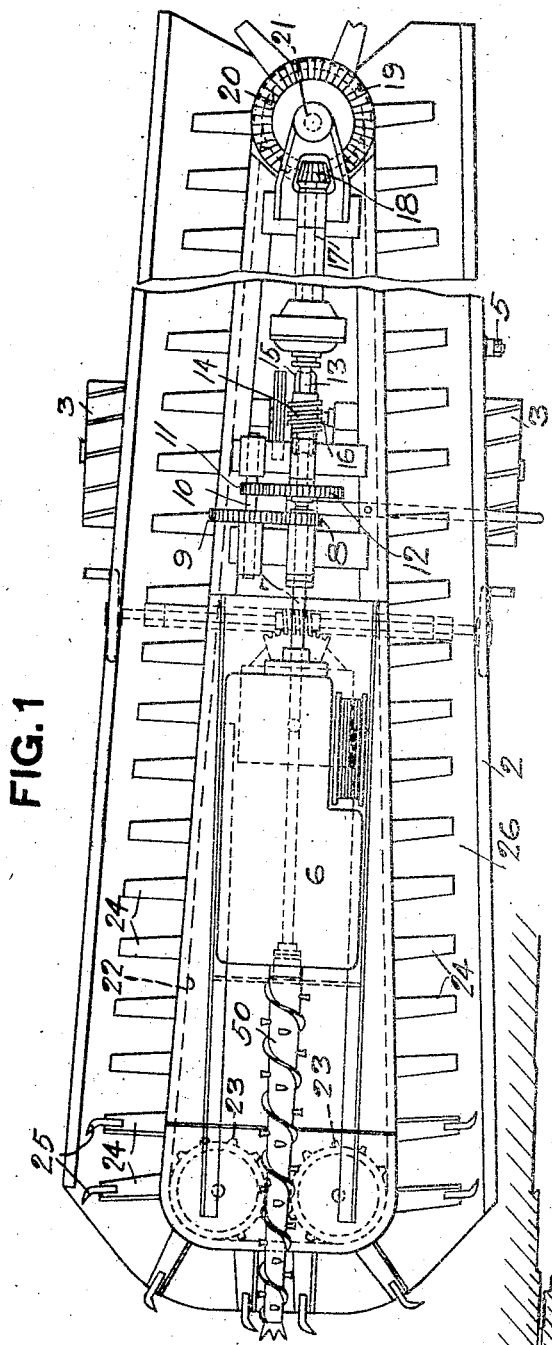
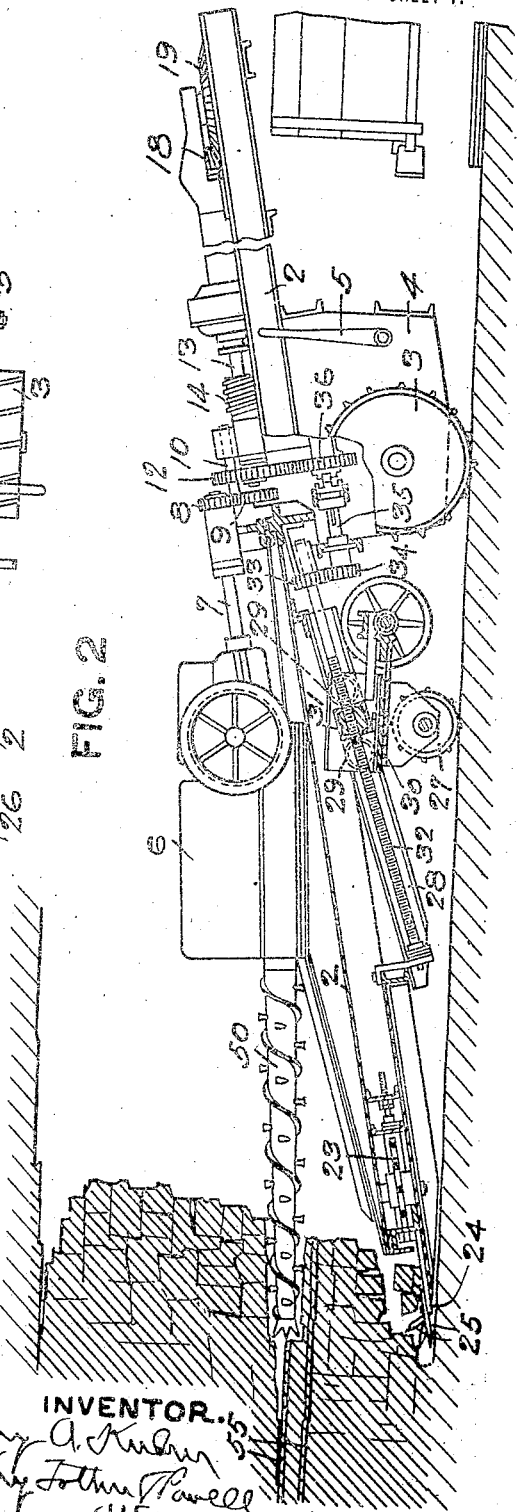
WITNESSES.
J. R. Keller.
John F. Will.
INVENTOR.
Harry A. Kuhn
By Arthur Powell
Atty H. A. KUHN.
MINING MACHINE.
APPLICATION FILED MAY 16, 1914.
1,285,744.
Patented Nov. 26, 1918.
2 SHEETS—SHEET 2.
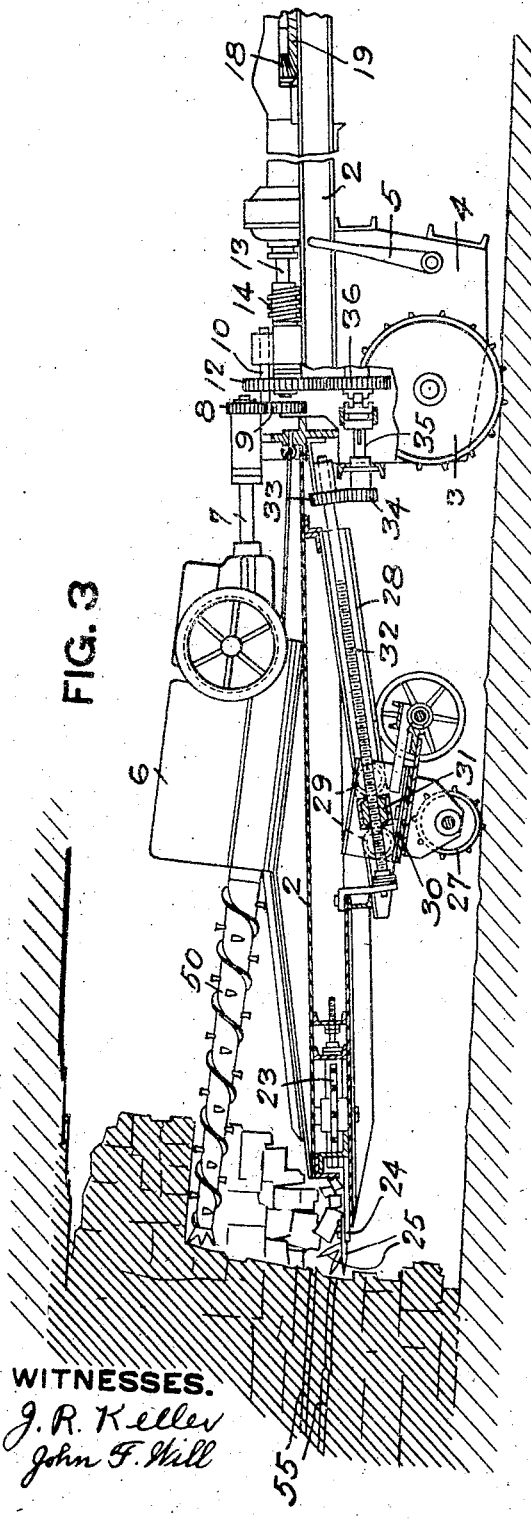
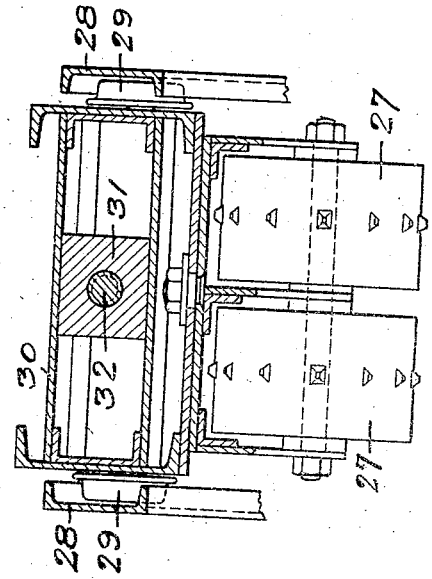
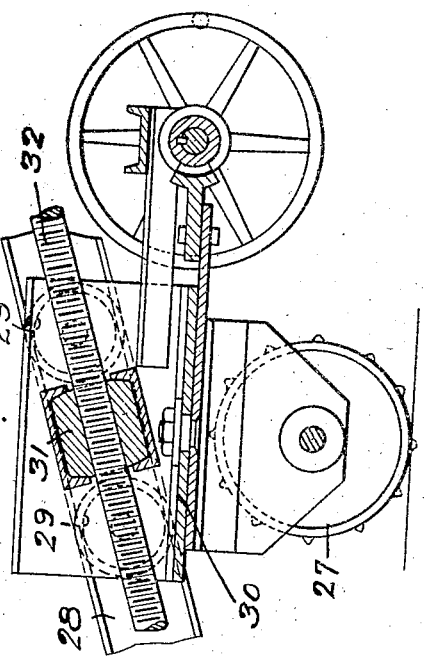
WITNESSES.
J. R. Keller
John F. Will
INVENTOR.
Harry A. Kuhn

UNITED STATES PATENT OFFICE.

HARRY A. KUHN, OF PITTSBURGH, PENNSYLVANIA.

MINING-MACHINE.

1,285,744.  Specification of Letters Patent.  Patented Nov. 26, 1918.

Application filed May 18, 1914. Serial No. 839,333.

*To all whom it may concern:*

Be it known that I, HARRY A. KUHN, a citizen of the United States, and resident of Pittsburgh, in the county of Allegheny and State of Pennsylvania, have invented a new and useful Improvement in Mining-Machines; and I do hereby declare the following to be a full, clear, and exact description thereof.

My invention relates to mining machines.

In the drawings Figure 1 designates a diagrammatic plan view of the machine; Fig. 2 is a side view partly in section; Fig. 3 is a like view showing the machine frame raised; Figs. 4 and 5 are details.

In the drawings, the main parts of the machine are the same as that which is illustrated and described in an application of even date herewith, Serial No. 839,325, and it is illustrated more or less diagrammatically.

The frame 2 is carried by the traction wheels 3 and inclosed within the box or housing 4 are the gear connections which drive the traction wheels 3. The lever 5 is employed for giving the forward or backward movement to the traction wheels 3 in advancing and withdrawing the frame 2. On the frame 2 is supported the motor 6 whose shaft 7 is provided with the pinion 8 meshing with the gear wheel 9 on the countershaft 10. The pinion 11 on the countershaft 10 engages the gear wheel 12 on the worm-shaft 13. The worm 14 engages the worm wheel 15 on the shaft 16 and from this worm wheel power is transmitted to the gearing in the housing 4 which drives the traction wheels 3.

The shaft 16 is connected up by suitable clutch mechanism with the shaft 17 and said shaft 17 has the beveled pinion 18 which meshes with the beveled teeth 19 on the large sprocket wheel 20 mounted on the shaft 21. A chain 22 engages the sprocket wheel 20, and said chain passes around the sprocket wheels 23 at the front end of the frame 2. The chain 22 has the flights 24 and the cutters 25, said flights moving along the feeding pan 26, all as illustrated and described in the aforesaid application. The frame 2 is inclined downwardly and is supported near its front end by steering wheels 27.

Channels 28 are secured to the frame 2, said channels being inclined and the flanges of said channels forming a track for the rollers 29 of the buggy 30. The buggy 30 has the threaded nut 31 with which the threaded bar 32 engages. The upper end of the threaded bar has the pinion 33 which meshes with the pinion 34 on the shaft 35. This shaft 35 has the gear wheel 36 which meshes with the gear wheel 12. By the rotation of the threaded bar, the buggy is advanced with its rollers moving in said channel bars and in this way the front end of the frame 2 is lifted as indicated in Fig. 3. The motor 6 above referred to in addition to driving the mechanism above described, is adapted to drive the cutter bar 50 and said cutter bar and motor may be removed from the frame 2 and used in the manner of the ordinary undercutting mechanism, and in a manner similar to the chain undercutter illustrated and described in an application filed by me, Serial No. 796,497. The motor 6 when drawn up onto the frame 2 as indicated in the drawings, acts as the power plant for the mechanism for driving the chain advancing the machine into the coal and the mechanism for raising the front end of the machine. In addition it drives the cutter bar 50.

Where my improved machine is used in connection with the method set forth in said application No. 796,497 the undercutting machine may be drawn off the frame 2 in the ordinary manner and an undercut made with the cutter bar 50 in the wall of coal. The coal is then shot to separate along its lines of cleavage, and the motor 6 and cutter bar having been drawn back onto the machine in the position indicated in the drawing, the machine is then ready to proceed with the mining or removal of the coal. Where slate bands 55 are present in the coal the cutter bar 50 may be brought into line with said slate band and as the machine is advanced into the coal, said cutter bar will act to cut into the band while the dislodging and conveying mechanism is operating along the line of the original undercut to dislodge and remove the coal. Simultaneously with its advancing of the machine into the coal, the mechanism for raising the forward end of the machine is put into operation and the threaded bar is revolved which feeds the buggy forward and raises the machine into position indicated in Fig. 3. Simultaneously with this raising of the machine the cutter bar 50 is rotated and at the same time moved upwardly through the coal cutting its way through the coal and acting to separate and dislodge the mass of coal so that the dislodging and conveying mechanism below acts in conjunction therewith to further dislodge and carry away the coal as the forward end of the machine moves upwardly.

In this manner, the cutter bar not only may be employed for undercutting the coal before shooting but said cutter bar furthermore acts in conjunction with the dislodging and conveying mechanism when the machine is brought up into position to remove the coal.

What I claim is:

In a mining machine, the combination with a suitable frame; of an endless chain; cutting mechanism carried by said chain; conveying mechanism carried by said chain; said chain and conveyer traveling laterally around said frame; a rotary cutter-bar carried by said frame; and means for raising and lowering said frame simultaneously with the operation of said chain and cutter-bar.

In testimony whereof, I, the said HARRY A. KUHN, have hereunto set my hand.

HARRY A. KUHN.

Witnesses:
JOHN F. WILL,
ROBT. D. TOTTEN.